United States Patent [19]

Noguti et al.

[11] Patent Number: 5,236,534

[45] Date of Patent: Aug. 17, 1993

[54] METHOD FOR FABRICATING AUTOMOTIVE DOOR TRIMS

[75] Inventors: Kaoru Noguti; Youichi Yamaguchi; Takao Yanagiya, all of Kanagawa, Japan

[73] Assignee: Kasai Kogyo Co., Ltd., Tokyo, Japan

[21] Appl. No.: 759,374

[22] Filed: Sep. 13, 1991

[30] Foreign Application Priority Data

Dec. 6, 1990 [WO] PCT Int'l Appl. ... PCT/JP90/01596

[51] Int. Cl.$^5$ .................................. B32B 31/18
[52] U.S. Cl. ........................ 156/245; 156/256; 156/258; 156/267; 156/293
[58] Field of Search ............ 156/245, 256, 258, 267, 156/293, 518, 530

[56] References Cited

U.S. PATENT DOCUMENTS 4,923,539  5/1990  Spengler et al. ............... 156/245
5,080,749  1/1992  Moriya et al. .................. 156/267

FOREIGN PATENT DOCUMENTS 2630037  10/1989  France ........................... 156/293
167223   9/1984   Japan ............................ 156/293
2142627  6/1987   Japan ............................ 156/267
2142628  6/1987   Japan ............................ 156/267
62724    3/1988   Japan .
158225   7/1988   Japan .
90737    4/1989   Japan .
209121   8/1989   Japan .
271231   10/1989  Japan .
280535   11/1989  Japan .

Primary Examiner—Caleb Weston
Attorney, Agent, or Firm—Dickstein, Shapiro & Morin

[57] ABSTRACT

A method for fabricating an automotive trim which is mounted with an ornamental member, in which an ornamental member which is not molded by any preliminary forming process is secured on a surface of a door trim main body with a bonding die set so as to closely follow a complicated surface profile of the door trim main body, extraneous parts of this ornamental member is cut by a thermal cutting blade attached to the bonding lower die, and the peripheral edge of the ornamental member is finished by a pressure bar.

11 Claims, 6 Drawing Sheets

METHOD FOR FABRICATING AUTOMOTIVE DOOR TRIMS

TECHNICAL FIELD

The present invention relates to a method for fabricating automotive door trims carrying ornamental members, and in particular to a method for fabricating automotive door trims carrying ornamental members which can simplify the process of mounting the ornamental members and improve the aesthetic appearance of the door trims.

BACKGROUND OF THE INVENTION

In recent years, to the end of improving the comfort quality of the interior of automobiles, measures have been taken to improve the quality of the material for automotive door trims and to mount cloth, carpet and other ornamental materials on appropriate parts of the door trims.

The conventional method of mounting such an ornamental member on a door trim consisted of molding the ornamental member into a desired shape, for instance, by a vacuum molding, trimming the peripheral part into a desired shape, and mounting the ornamental member on the door trim with a bonding die set.

At such a time, the peripheral edge of the ornamental member is fitted into a peripheral groove formed in the door trim for the purpose of improving the appearance of the peripheral edge of the ornamental member.

The ornamental member typically consists of an ornamental sheet made of such material as cloth or carpet which is backed by a backing member made of such material as polyvinylchloride in order to maintain the curved shape thereof.

Therefore, it is known that a substantial increase in cost is incurred by the conventional method of mounting an ornamental member which involves a large number of steps such as the step of molding the ornamental member, the trimming step, the step of positioning the ornamental member, the step of integrally joining the door trim main body and the ornamental member, and the step of processing the peripheral edge of the ornamental member.

Further, in order to impart the capability to retain its shape to the ornamental member, a backing material is required, and this not only causes an increase in the material cost but also creates the need to position the pre-formed ornamental member exactly in the bonding die set. In particular, when the ornamental part of the ornamental member is provided with a complicated three-dimensional shape, positioning the ornamental member in the bonding die set is extremely cumbersome, and this causes a significant reduction in the production efficiency.

When there is any positional error in positioning the ornamental member in the bonding die set, it becomes impossible to accurately push the peripheral edge of the ornamental member into a peripheral groove of the door trim main body, and it causes the known problem of impairing the external appearance of the door trim because a part of the peripheral edge of the ornamental member is left exposed.

A primary object of the present invention is to provide a method for fabricating automotive door trims which can eliminate the need for the preliminary forming step for the ornamental member that is to be mounted on the door trim main body so as to simplify the fabrication process.

Another object of the present invention is to provide a method for fabricating automotive door trims which allows the ornamental member to closely follow the profile of the door trim main body even when the part where the ornamental member is to be mounted is given with a complicated three-dimensional shape, and eliminate the need for accurate positioning the ornamental member so that the mounting of the ornamental member can be achieved in a short time.

Yet another object of the present invention is to provide a method for fabricating automotive door trims which can maintain the satisfactory appearance of the door trim by allowing the peripheral edge of the ornamental member to be accurately forced into the peripheral groove of the door trim member.

BRIEF DESCRIPTION OF THE DRAWINGS

These and other objects of the present invention as well as the advantages thereof will become apparent from the following description of the present invention with reference to the appended drawings, in which:

FIG. 4 is a sectional view showing the step of placing the door trim main body and the ornamental member in the bonding die device;

FIG. 5 is a sectional view showing the step of pressure bonding the ornamental member to the door trim main body by engaging the bonding dies;

FIG. 6 is a sectional view of an essential part showing the step of cutting away extraneous parts of the ornamental member with a thermal cutting blade following the pressure bonding of the ornamental member on the door trim main body;

FIG. 7 is a sectional view of an essential part showing the step of forcing the peripheral edge of the ornamental member into the peripheral groove of the door trim main body following the step of cutting away the extraneous parts of the ornamental member;

DESCRIPTION OF THE PREFERRED EMBODIMENTS

To the end of achieving the above mentioned objects, the method for fabricating an automotive door trim of the present invention is characterized by the forming step consisting of forming a core member into a desired shape, forming a door trim main body by integrally bonding a surface skin member on a surface of the core member, and forming a peripheral groove along a peripheral edge of an area over which the ornamental member is to be mounted; and the integral assembly step consisting of applying a bonding agent on the area of the door trim main body on which the ornamental member is to be placed, placing this door trim main body on a surface of a bonding upper die, placing the ornamental member on a surface of a bonding lower die having a die surface adapted to a surface contour of the area of the door trim member over which the ornamental member is to be mounted, bonding the door trim main body and the ornamental member together by engaging the bonding upper and lower dies lifting a vertically moveable thermal cutting blade along an outer periphery of the bonding lower die until a peripheral edge of the ornamental member is cut by heat into a desired profile, lifting a pressure bar disposed along an inner circumference of the thermal cutting blade so that the peripheral edge of the ornamental member may be forced into the peripheral groove of the door trim member by the pressure bar.

Before describing the method of the present invention, the structure of the automotive door trim which is to be fabricated by the method of the present invention is described in the following with reference to FIGS. 1 and 2.

Figure 1:
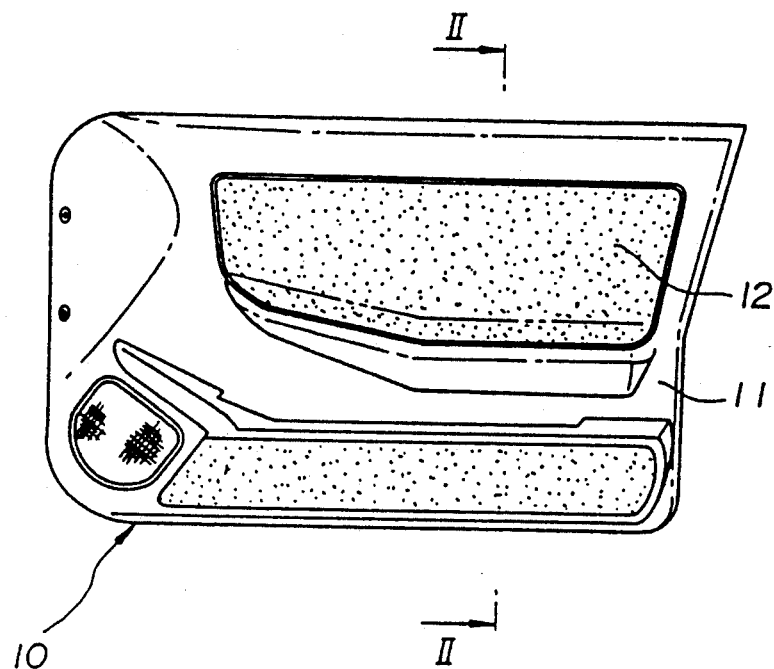
FIG. 1 is a front view of an automotive door trim which is fabricated according to the method of the present invention.
Figure 2:
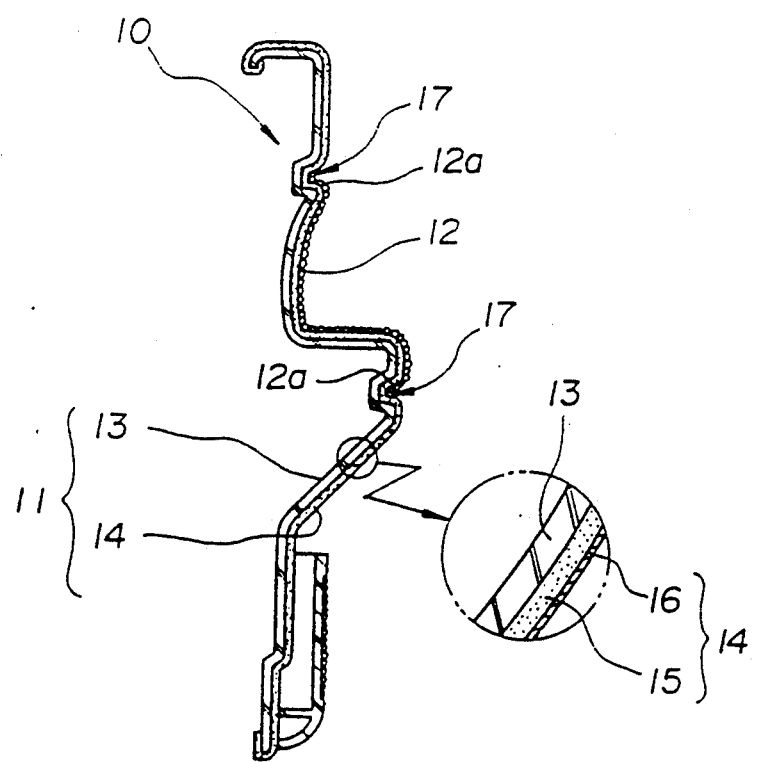
FIG. 2 is a sectional view taken along line II—II of FIG. 1.

In FIGS. 1 and 2, the automotive door trim 10 essentially consists of a door trim main body 11, and an ornamental member 12 which may, for instance, consist of fabric mounted on a suitable part of the door trim main body 11.

More specifically, the door trim main body 11 consists of a core member 13 made of wood fiber board or the like thermally press formed into a desired shape, and a surface skin member 14 integrally attached to the surface of the core member 13, for instance, by vacuum forming, and the surface skin member 14 is formed by laminating a foam layer 15 consisting of polypropylene, polyethylene or the like on the reverse surface of a surface skin sheet make of PVC sheet mixed with ABS, or the like.

The door trim main body 11 is provided with a peripheral groove 17 around the periphery of the ornamental member 12, and this peripheral groove 17 is formed at the same time as the press forming of the core member 13.

The ornamental member 12 may be appropriately selected from such fabric as velvet, jersey, tricot and moquette, and may be optionally laminated with a pad material on its reverse surface for the purpose of imparting a cushioning property thereto. Further, the peripheral edge 12a of the ornamental member 12 is forced into the peripheral groove 17 formed in the door trim main body 11 as an edge process for producing a favorable external appearance.

The core member 13 may also be made of thermoplastic composite resin plate or the like, and, in this case, the core member 13 having a desired shape can be obtained by cold press forming a sheet material which is softened by a preliminary heating step.

Now the process of fabricating the automotive door trim 10 is now described in the following.

First of all, with respect to this door trim main body 11, the core member 13 is formed into a desired shape by cold press forming, and the surface skin member 14 is integrally bonded on the surface of the core member 13 by vacuum forming or the like.

Figure 3:
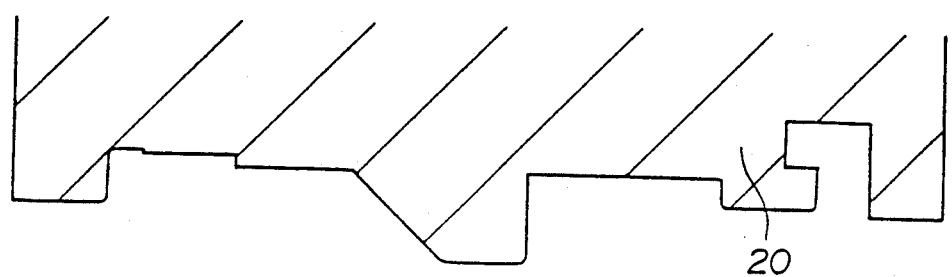
FIG. 3 is a sectional view showing the structure of the bonding die which is used for carrying out the method of the present invention.
Figure 3:
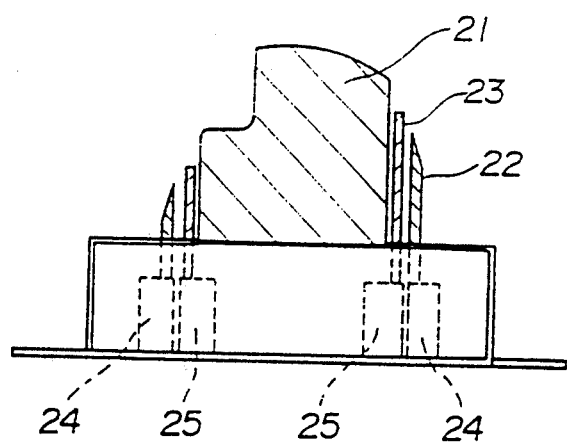

FIG. 3 shows the structure of the bonding die device employed for the step of integrally joining the door trim main body 11 and the ornamental member 12, and this device comprises a bonding upper die 20 on which the door trim main body 11 is to be placed, a bonding lower die 21 on which the ornamental member is to be placed, a vertically moveable thermal cutting blade 22 arranged around the outer periphery of the bonding lower die 21, and a vertically moveable pressure bar 23 placed along the inner periphery of the thermal cutting blade 22. Below the thermal cutting blade 22 and the pressure bar 23 are provided lifting devices 24 and 25, respectively, which may, for instance, consist of hydraulic cylinders so that the thermal cutting blade 22 and the pressure bar 23 may be independently moved vertically. The bonding lower die 21 is also vertically moveable by a lifting device not shown in the drawing so that the bonding lower die 21 may move toward and away from the bonding upper die 20.

Now the process of integrally joining the door trim main body 11 with the ornamental member 12 by mounting the latter on the former is described in the following with reference to FIGS. 4 through 7.

Figure 4:
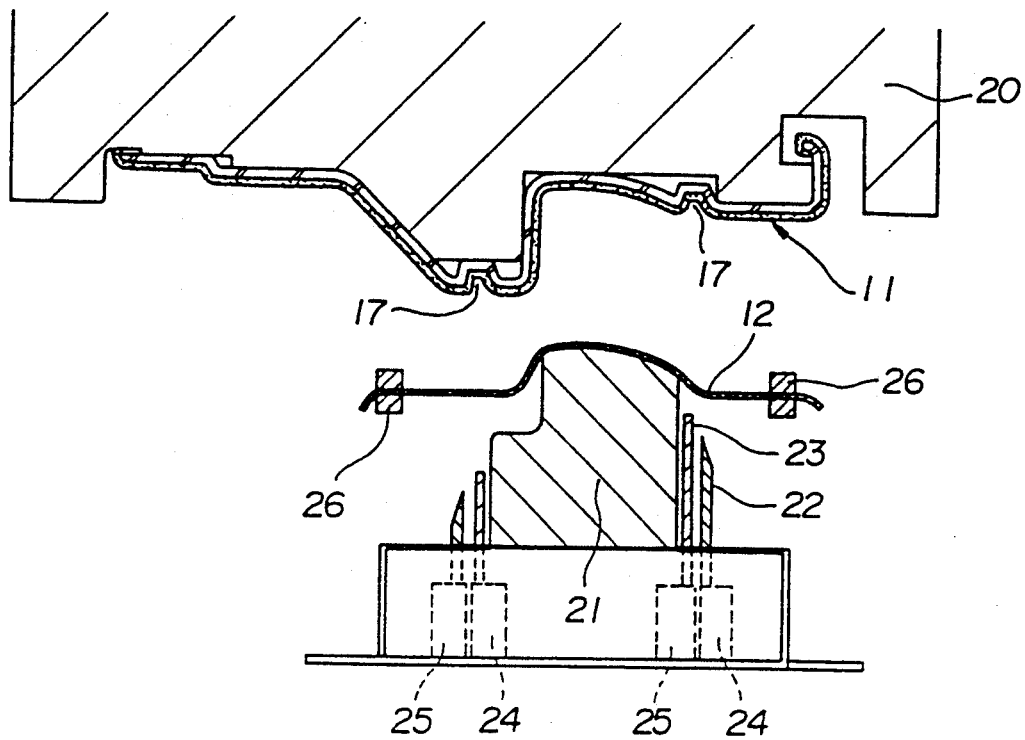
FIGS. 4 through 7 show different steps of fabricating the door trim shown in FIG. 1 by using the bonding die device illustrated in FIG. 3.

Now, as illustrated in FIG. 4, the door trim main body 11 is placed on the bonding upper die 20 with face down, and the ornamental member 12 is placed on the bonding lower die 21. The peripheral part of the ornamental member 12 is retained by a clamp device 26. During the step of positioning the door trim main body 11 and the ornamental member 12, the thermal cutting blade 22 and the pressure bar 23 are placed at their lowermost positions.

Figure 5:
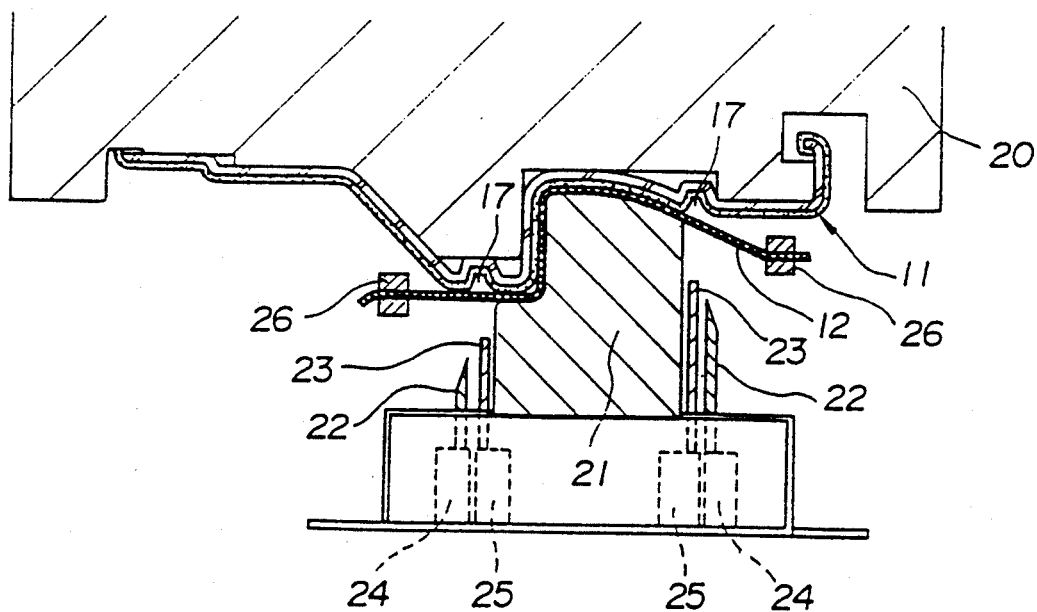

Then, upon completion of this positioning step, the bonding lower die 21 is lifted until the bonding upper and lower dies 20 and 21 are engaged as illustrated in FIG. 5. Since a bonding agent is applied to the part of the door trim main body 11 corresponding to the ornamental member 12 in advance, the ornamental member 12 is securely bonded to the door trim main body 11 closely following its complicated profile when the bonding upper and lower dies 20 and 21 illustrated in FIG. 5 are engaged.

Figure 6:
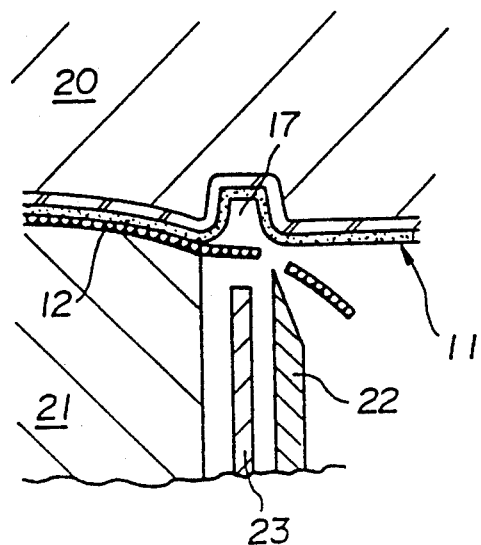
Figure 7:
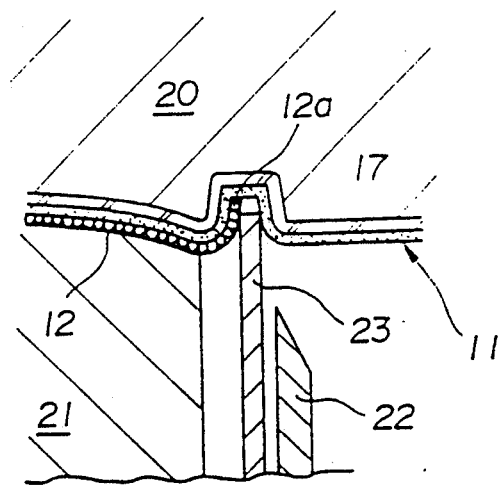

When the bonding upper and lower dies 20 and 21 are engaged, the first lifting device 24 is activated and the thermal cutting blade 22 is lifted until it thermally cuts off extraneous parts of the ornamental member 12 as illustrated in FIG. 6. As can be seen from FIG. 6, the prescribed position of the thermal cutting blade 22 is defined slightly outwardly of the peripheral groove 17 formed in the door trim main body 11.

Upon completion of the cutting step by the thermal cutting blade 22, the first lifting device 24 is activated and the thermal cutting blade 22 is lowered. In synchronization with it, the second lifting device 25 is activated, and the pressure bar 23 is started to be lifted so as to force the peripheral edge 12a of the ornamental member 12 into the peripheral groove 17. Since the thermal cutting blade 22 is placed a certain predetermined distance away from the outer periphery of the bonding lower die 21, the dimension of the peripheral edge 12a of the ornamental member 12 that is forced into the peripheral groove 17 is always constant.

Thus, according to the present invention, since the extraneous parts of the ornamental member 12 is thermally cut off by the thermal cutting blade 22 when press bonding the door trim main body 11 and the ornamental member 12 with the bonding upper and lower dies 20 and 21, the conventionally necessary steps of molding the ornamental member 12 and trimming the ornamental member 12 can be eliminated, and a substantial reduction in cost can be achieved through the simplification of the fabrication process.

Further, according to the present invention, since the ornamental member 12 is cut into a desired shape by the thermal cutting blade 22 disposed around the outer periphery of the bonding lower die 21, and the accuracy of positioning is not so important as in the case of the conventional process in which the molded members were required to be positioned and bonded together, the production efficiency can be improved even when the ornamental part of the door trim main body 11 is given with a complicated three-dimensional shape.

Additionally, according to the present invention, the ornamental member 12 is not required to be capable of retaining its shape because the thermal cutting blade 22 cuts off the extraneous parts of the ornamental member 12 after the door trim member 11 and the ornamental member 12 are bonded by the bonding upper and lower dies 20 and 21 with the ornamental member 12 closely following the three-dimensional contour of the door trim member 11, and the need for the conventional backing member is eliminated, so that a substantial reduction in the manufacturing cost can be achieved through savings in the material cost.

According to the present invention, since the ornamental member 12 may be cut to an accurate profile with the thermal cutting blade 22, there is no need to consider the positioning accuracy, and the peripheral edge 12a of the ornamental member 12 may be forced into and secured in the peripheral groove 17 of the door trim main body 11 by a fixed width so that the peripheral edge 12 of the ornamental member 12 is processed in a neat fashion, and the overall external appearance of the finished product is accordingly improved.

Now an alternate embodiment of the present invention is described in the following.

Figure 8:
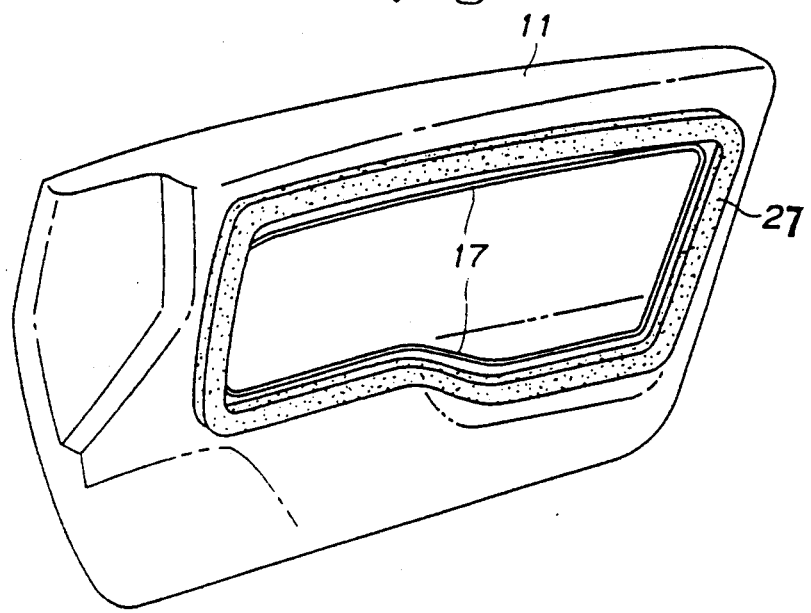
FIG. 8 is a perspective view of a protector which may be optionally used in the step of cutting the ornamental member according to the present invention.

FIG. 8 is an external appearance view of a protector 27 that is employed in the step of cutting the extraneous parts of the ornamental member 12, and this protector 27 consists of a frame made of metallic plate placed along the outer periphery of the peripheral groove 17 of the door trim main body 11 as illustrated in FIG. 8.

Figure 9:
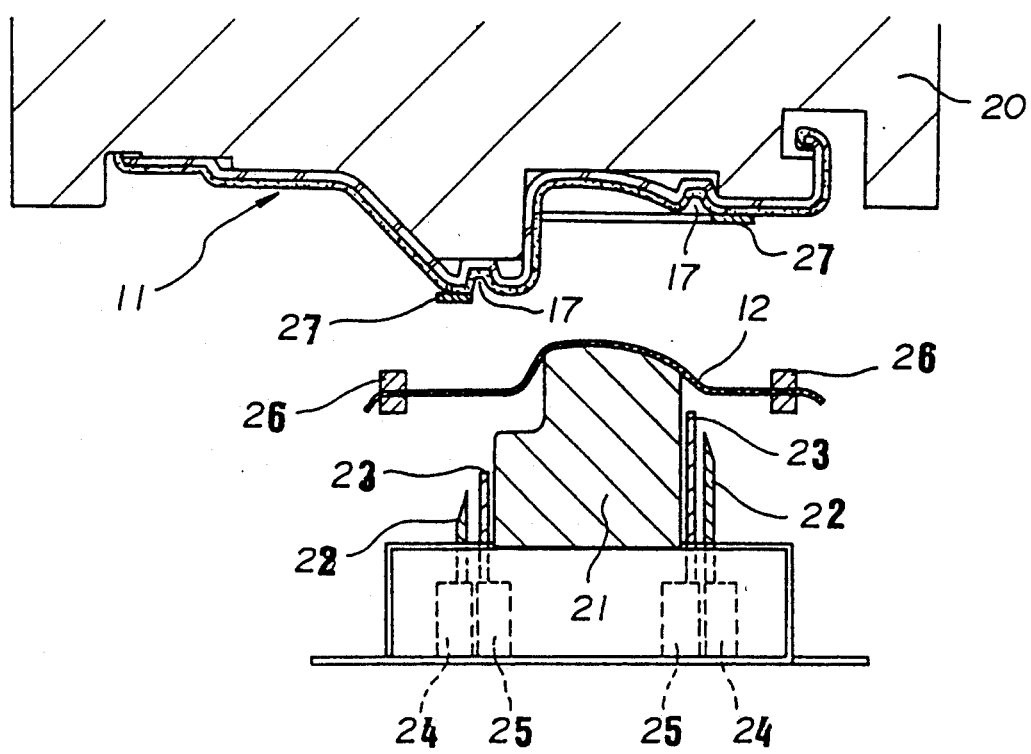
FIG. 9 is a sectional view of the overall structure of the bonding die device when the protector illustrated in FIG. 8 is placed in a prescribed position.
Figure 10:
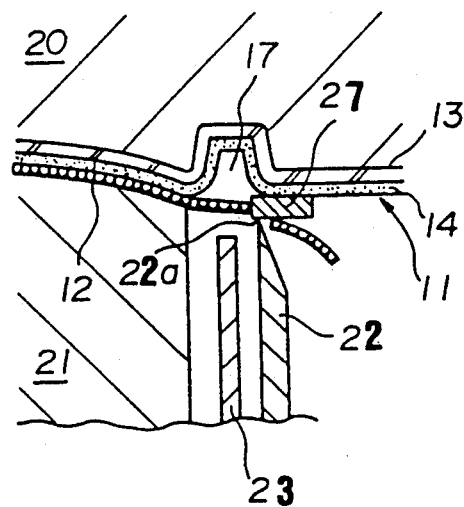
FIG. 10 is a sectional view of an essential part showing the step of cutting extraneous parts of the ornamental member using the protector illustrated in FIG. 8.

This protector 27 is placed and secured along the outer periphery of the peripheral groove 17 of the door trim main body 11 when it is placed on the surface of the bonding upper die 20 as illustrated in FIG. 9.

Therefore, during the step of cutting the ornamental member 12 with the thermal cutting blade 22, the cutting edge 22a of the thermal cutting blade 22 touches the ornamental member 12 and contacts the protector 27 after melting and cutting the ornamental member 12 so that protector 27 may protect the surface skin member 14 of the door trim main body 11 with the result that the risk of cutting or otherwise damaging the surface skin member 14 or leaving shiny spots on the surface skin member 14 can be eliminated.

Also, since the protector 27 can prevent the heat and the excessive pressure of the thermal cutting blade 22 from adversely affecting the ornamental member 12, the surface skin member 14 is favorably protected, and the protector 27 eliminates the need for a high level of accuracy in the pressure of the bonding lower die 21 and the dimensions of the thermal cutting blade 12.

Since the trimming of the ornamental member 12 can be carried out very quickly with heat and pressure by pressing the cutting edge 22a of the thermal cutting blade 22 which is guided by the protector 27, the fabrication time is reduced without adversely affecting the surface of the ornamental member 12 in any way, and there is provided a highly practical fabrication method.

Figure 11:
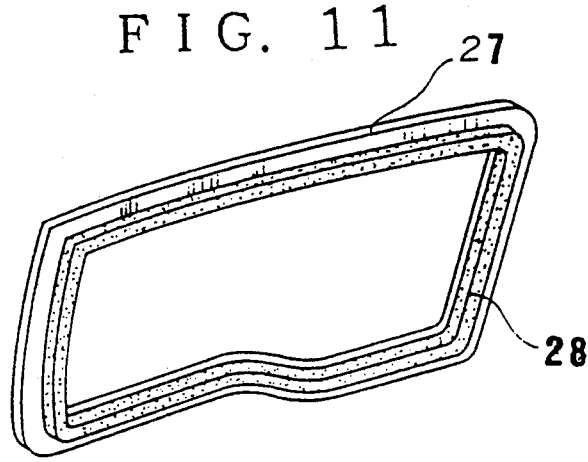
FIG. 11 is a perspective view of another embodiment of the protector.

A modified embodiment of the protector 27 employed in the present invention is now described with reference to FIGS. 11 and 12. This protector 27 includes a spacer 28 which is placed along the inner periphery of the protector 27 as illustrated in the drawings, and, according to this particular embodiment, the spacer 28 made of such heat resistant material as mica is secured to the protector 27 made of metal by using a bonding agent.

Figure 12:
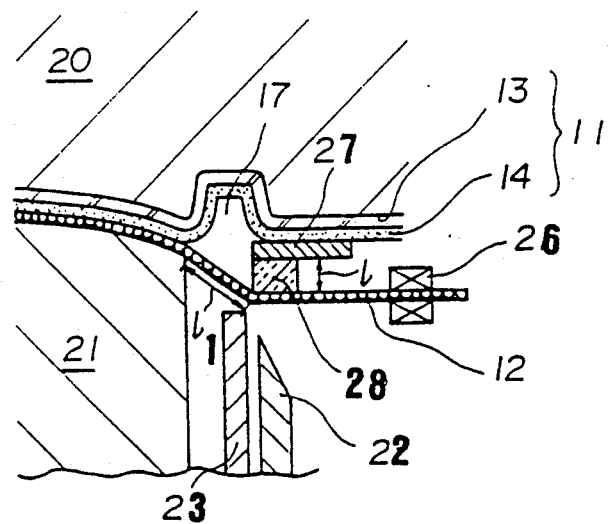
FIG. 12 is a sectional view of an essential part showing the step of cutting extraneous parts of the ornamental member using the protector illustrated in FIG. 11.

By changing the thickness of the spacer 28 (indicated by "l" in the drawing) as illustrated in FIG. 12, the width (indicated by "$l_1$" in the drawing) of the peripheral edge 12a of the ornamental member 12 that is to be forced into the peripheral groove 17 can be adjusted. Thus, this embodiment offers a high level of freedom in design since the protector 27 allows the configuration of the peripheral groove 17 of the door trim main body 11 and the depth of the peripheral groove 17 to be freely determined.

We claim:

1. A method for fabricating an automotive door trim by mounting an ornamental member on a predetermined surface area of a door trim main body comprising the steps of:

forming a core member 13 into a desired shape;

forming a door trim main body 11 by integrally bonding a surface skin member 14 onto a surface of the core member 13;

forming a peripheral groove 17 along a peripheral edge of an area over which an ornamental member 12 is to be mounted;

applying a bonding agent on said area on which the ornamental member is to be mounted;

placing the door trim main body 11 on a surface of a first bonding die, placing the ornamental member 12 on a surface of a second bonding die 21 having a die surface contour complementary to a surface contour of the area of the door trim member 11 over which the ornamental member 12 is to be mounted;

bonding the door trim main body 11 and the ornamental member 12 together by engaging the bonding;

dies 20 and 21;

moving a thermal cutting blade 22 provided along an outer periphery of the second bonding die 21 until a peripheral edge of the ornamental member 12 is cut by heat into a desired profile; and, moving a pressure bar 23 disposed along an inner circumference of the thermal cutting blade 22 to contact press the peripheral edge of the ornamental member 12 into the peripheral groove 17 of the door trim member 11.

2. A method for fabricating an automotive door trim according to claim 1, wherein the ornamental member 12 consists of a fabric.

3. A method for fabricating an automotive door trim according to claim 1 or 2, wherein the core member 13 of the door trim main body 11 consists of wood fiber board which is heated and pressed into a desired shape.

4. A method for fabricating an automotive door trim according to claim 3, wherein the surface skin member 14 of the door trim main body 11 consists of a surface skin sheet 16 laminated with a foam layer 15 over its reverse surface.

5. A method for fabricating an automotive door trim according to claim 3, wherein a protector 27 is placed between the thermal cutting blade 22 and the door trim main body 11 when the ornamental member 12 is being thermally cut by the thermal cutting blade 22 so that the surface skin member 14 of the door trim main body 11 may be protected by the protector 27.

6. A method for fabricating an automotive door trim according to claim 5, wherein a spacer 28 is placed along an inner peripheral surface of the protector 27 so that the width of the peripheral edge of the ornamental member 12 that is to be forced into the peripheral groove 17 of the door trim main body 11 is determined by the thickness of said spacer.

7. A method for fabricating an automotive door trim according to claim 1 or 2, wherein the surface skin member 14 of the door trim main body 11 consists of a surface skin sheet 16 laminated with a foam layer 15 over its reverse surface.

8. A method for fabricating an automotive door trim according to claim 7, wherein a protector 27 is placed between the thermal cutting blade 22 and the door trim main body 11 when the ornamental member 12 is being thermally cut by the thermal cutting blade 22 so that the surface skin member 14 of the door trim main body 11 may be protected by the protector 27.

9. A method for fabricating an automotive door trim according to claim 8, wherein a spacer 28 is placed along an inner peripheral surface of the protector 27 so that the width of the peripheral edge of the ornamental member 12 that is to be forced into the peripheral groove 17 of the door trim main body 11 is determined by the thickness of said spacer.

10. A method for fabricating an automotive door trim according to claim 1 or 2, wherein a protector 27 is placed between the thermal cutting blade 22 and the door trim main body 11 when the ornamental member 12 is being thermally cut by the thermal cutting blade 22 so that the surface skin member 14 of the door trim main body 11 may be protected by the protector 27.

11. A method for fabricating an automotive door trim according to claim 10, wherein a spacer 28 is placed along an inner peripheral surface of the protector 27 so that the width of the peripheral edge of the ornamental member 12 that is to be forced into the peripheral groove 17 of the door trim main body 11 is determined by the thickness of said spacer.

* * * * *